United States Patent
Andrews et al.

(10) Patent No.: US 8,707,087 B2
(45) Date of Patent: Apr. 22, 2014

(54) RESTORATION OF AN IMAGE BACKUP USING INFORMATION ON OTHER INFORMATION HANDLING SYSTEMS

(75) Inventors: Carlton Andrews, Austin, TX (US); Clint H. O'Connor, Austin, TX (US); Yuan-Chang Lo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 12/782,015

(22) Filed: May 18, 2010

(65) Prior Publication Data

US 2011/0289350 A1    Nov. 24, 2011

(51) Int. Cl.
*G06F 11/00*    (2006.01)

(52) U.S. Cl.
USPC ........... 714/6.1; 714/6.12; 711/147; 711/150; 709/213

(58) Field of Classification Search
USPC ........... 714/6.1, 6.12; 711/147, 150; 709/213
See application file for complete search history.

(56) References Cited

U.S. PATENT DOCUMENTS

| | | | |
|---|---|---|---|
| 5,490,216 A | | 2/1996 | Richardson, III |
| 5,659,614 A | * | 8/1997 | Bailey, III ..................... 713/165 |
| 5,715,314 A | | 2/1998 | Payne et al. |
| 5,864,664 A | | 1/1999 | Capps, Jr. et al. |
| 5,948,078 A | | 9/1999 | Joffe |
| 6,032,859 A | | 3/2000 | Muehlberger et al. |
| 6,170,059 B1 | | 1/2001 | Pruett et al. |
| 6,209,089 B1 | | 3/2001 | Selitrennikoff et al. |
| 6,292,941 B1 | | 9/2001 | Jollands |
| 6,301,612 B1 | | 10/2001 | Selitrennikoff et al. |
| 6,314,418 B1 | * | 11/2001 | Namba ......................... 707/696 |
| 6,321,262 B1 | | 11/2001 | Springer |
| 6,324,525 B1 | | 11/2001 | Kramer et al. |
| 6,389,403 B1 | | 5/2002 | Dorak, Jr. |
| 6,425,126 B1 | | 7/2002 | Branson et al. |
| 6,502,205 B1 | * | 12/2002 | Yanai et al. ................... 714/6.32 |
| 6,647,532 B1 | | 11/2003 | Boede et al. |
| 6,865,655 B1 | * | 3/2005 | Andersen ....................... 711/162 |
| 6,931,558 B1 | * | 8/2005 | Jeffe et al. ...................... 713/340 |
| 7,047,411 B1 | | 5/2006 | DeMello et al. |
| 7,120,593 B1 | | 10/2006 | Fry et al. |
| 7,330,997 B1 | * | 2/2008 | Odom ........................... 714/6.23 |
| 7,352,999 B2 | | 4/2008 | Miettinen |
| 7,412,534 B2 | | 8/2008 | Tsang et al. |
| 7,417,546 B2 | | 8/2008 | Llorca et al. |
| 7,428,413 B2 | | 9/2008 | Fink |
| 7,483,860 B2 | | 1/2009 | Cronce et al. |
| 7,496,739 B1 | | 2/2009 | Raghavan et al. |
| 7,503,072 B2 | | 3/2009 | Hughes et al. |
| 7,506,382 B2 | | 3/2009 | Padole et al. |
| 7,516,104 B1 | | 4/2009 | Scardino |

(Continued)

OTHER PUBLICATIONS

Backup P2P Secured peer to peer backup, http://www.ohloh.net/p/p2pbackupsmile, printed Jun. 18, 2010.

(Continued)

*Primary Examiner* — Loan L. T. Truong
(74) *Attorney, Agent, or Firm* — Terrile, Cannatti, Chambers & Holland, LLP; Stephen A. Terrile

(57) ABSTRACT

A backup and restoration process which first attempts to recover information blocks from locally connected information handling systems executing a backup/restore service before looking to the slower access cloud store to recover data blocks.

15 Claims, 4 Drawing Sheets

(56) References Cited

U.S. PATENT DOCUMENTS

| | | | |
|---|---|---|---|
| 7,523,072 B2 | 4/2009 | Stefik et al. | |
| 7,526,451 B2 | 4/2009 | Park et al. | |
| 7,555,447 B2 | 6/2009 | Chinnappan et al. | |
| 7,565,325 B2 | 7/2009 | Lenard et al. | |
| 7,593,898 B1 | 9/2009 | Tsuei et al. | |
| 7,783,737 B2 | 8/2010 | Fujino et al. | |
| 7,971,199 B1* | 6/2011 | Chen | 717/168 |
| 8,219,769 B1* | 7/2012 | Wilk | 711/162 |
| 8,219,850 B1* | 7/2012 | Wang et al. | 714/6.1 |
| 8,341,455 B2* | 12/2012 | Maki et al. | 714/4.11 |
| 8,452,731 B2* | 5/2013 | Preslan et al. | 707/652 |
| 8,533,156 B2* | 9/2013 | Ryder | 707/626 |
| 2002/0046232 A1* | 4/2002 | Adams et al. | 709/200 |
| 2002/0059270 A1 | 5/2002 | Schlabach et al. | |
| 2002/0076204 A1 | 6/2002 | Nakano et al. | |
| 2002/0077986 A1 | 6/2002 | Kobata et al. | |
| 2002/0088855 A1 | 7/2002 | Hodes | |
| 2003/0028439 A1 | 2/2003 | Cox | |
| 2003/0028451 A1* | 2/2003 | Ananian | 705/27 |
| 2003/0033205 A1 | 2/2003 | Nowers et al. | |
| 2003/0060157 A1 | 3/2003 | Henrick | |
| 2003/0088571 A1* | 5/2003 | Ekkel | 707/100 |
| 2003/0110126 A1 | 6/2003 | Dunkeld et al. | |
| 2003/0120928 A1* | 6/2003 | Cato et al. | 713/176 |
| 2003/0149750 A1* | 8/2003 | Franzenburg | 709/220 |
| 2004/0003039 A1* | 1/2004 | Humphrey et al. | 709/204 |
| 2004/0022227 A1 | 2/2004 | Lynch et al. | |
| 2004/0059938 A1 | 3/2004 | Hughes et al. | |
| 2004/0093273 A1 | 5/2004 | Laurent et al. | |
| 2004/0128551 A1 | 7/2004 | Walker et al. | |
| 2004/0143746 A1 | 7/2004 | Ligeti et al. | |
| 2005/0027657 A1 | 2/2005 | Leontiev et al. | |
| 2005/0060388 A1 | 3/2005 | Tatsumi et al. | |
| 2005/0229047 A1* | 10/2005 | Hanes et al. | 714/100 |
| 2005/0262573 A1 | 11/2005 | Bo et al. | |
| 2005/0268115 A1 | 12/2005 | Barde et al. | |
| 2006/0062426 A1 | 3/2006 | Levy et al. | |
| 2006/0161635 A1* | 7/2006 | Lamkin et al. | 709/217 |
| 2006/0229904 A1* | 10/2006 | Hunter et al. | 705/1 |
| 2006/0276174 A1 | 12/2006 | Katz et al. | |
| 2007/0124349 A1* | 5/2007 | Taylor | 707/204 |
| 2007/0130233 A1* | 6/2007 | Christensen | 707/204 |
| 2007/0157196 A1* | 7/2007 | Goicea et al. | 717/174 |
| 2007/0174621 A1 | 7/2007 | Ducharme | |
| 2007/0233580 A1 | 10/2007 | Pike et al. | |
| 2007/0255758 A1* | 11/2007 | Zheng et al. | 707/200 |
| 2007/0294566 A1* | 12/2007 | Solyanik | 714/6 |
| 2008/0172583 A1* | 7/2008 | Mahajan et al. | 714/57 |
| 2008/0177807 A1* | 7/2008 | Dile et al. | 707/204 |
| 2008/0195871 A1 | 8/2008 | Peinado et al. | |
| 2008/0208933 A1* | 8/2008 | Lyon | 707/204 |
| 2008/0215633 A1* | 9/2008 | Dunkeld et al. | 707/104.1 |
| 2009/0083843 A1 | 3/2009 | Wilkinson et al. | |
| 2009/0089340 A1* | 4/2009 | Ohr et al. | 707/204 |
| 2009/0125393 A1* | 5/2009 | Hwang et al. | 705/14 |
| 2009/0164470 A1* | 6/2009 | Savage et al. | 707/9 |
| 2009/0187491 A1 | 7/2009 | Bull et al. | |
| 2009/0193102 A1* | 7/2009 | Trujillo | 709/220 |
| 2009/0228368 A1 | 9/2009 | Brown | |
| 2009/0228488 A1* | 9/2009 | Brand et al. | 707/9 |
| 2009/0234892 A1* | 9/2009 | Anglin et al. | 707/201 |
| 2009/0248883 A1* | 10/2009 | Suryanarayana et al. | 709/229 |
| 2009/0265545 A1 | 10/2009 | Satoh et al. | |
| 2010/0106687 A1* | 4/2010 | Marcy et al. | 707/622 |
| 2010/0106691 A1* | 4/2010 | Preslan et al. | 707/674 |
| 2010/0122030 A1* | 5/2010 | Peters et al. | 711/114 |
| 2010/0174918 A1* | 7/2010 | Hoffman et al. | 713/189 |
| 2010/0235921 A1 | 9/2010 | Foster | |
| 2010/0257142 A1* | 10/2010 | Murphy et al. | 707/681 |
| 2010/0257185 A1* | 10/2010 | Dvir et al. | 707/748 |
| 2010/0257346 A1* | 10/2010 | Sosnosky et al. | 713/2 |
| 2010/0257403 A1* | 10/2010 | Virk et al. | 714/15 |
| 2010/0306227 A1* | 12/2010 | Fleming et al. | 707/763 |
| 2010/0306267 A1* | 12/2010 | Zamkoff et al. | 707/783 |
| 2010/0325735 A1 | 12/2010 | Etchegoyen | |
| 2011/0016466 A1* | 1/2011 | Liu et al. | 718/1 |
| 2011/0022812 A1* | 1/2011 | van Der Linden et al. | 711/163 |
| 2011/0072291 A1* | 3/2011 | Murase | 713/324 |
| 2011/0099200 A1* | 4/2011 | Blount et al. | 707/770 |
| 2011/0173405 A1* | 7/2011 | Grabarnik et al. | 711/162 |
| 2011/0184998 A1* | 7/2011 | Palahnuk et al. | 707/827 |

OTHER PUBLICATIONS

Landers et al., PeerStore: Better Performance by Relaxing in Peer-to-Peer Backup, Fakultät Für Informatik, Technische Universitat München, 2004 http://www.computer.org/portal/web/csdl/doi/10.1109/PTP.2004.1334933.

Peer-to-Peer Viral Backup: Cucku 2.0 Definitely Scores Points for Imagination, http://www.fileslinger.com/2009/05/peer-to-peer-viral-backup-cucku-20-definitely-scores-points-forimagination, printed Jun. 18, 2010.

T. Bonkenburg et al, LifeBoat—An Autonomic Backup and Restore Solution, http://www.usenix.org/event/lisa04/tech/full_papers/bonkenburg/bonkenburg.pdf, 2004 LISA XVIII—Nov. 14-19, 2004—Atlanta, GA.

M. Vrable, Cumulus: Filesystem Backup to the Cloud, http://cseweb.ucsd.edu/~voelker/pubs/cumulus-fast09.pdf, Feb. 26, 2009.

L. Mearian, Start-up unveils hybrid cloud/on-site backup service, http://www.itworld.com/storage/64972/start-unveils-hybrid-cloudon-site-backup-service, Mar. 24, 2009.

Storage-Switzerland.com, Hybrid Cloud Backup for the SMB, http://www.storage-switzerland.com/Articles/Entries/2009/4/24__Hybrid_Cloud_Backup_for_the_SMB.html, Apr. 24, 2009.

M. Staimer, Asigra, Why Cloud Backup/Recovery (Private, Public, or Hybrid) WILL be Your Data Protection, http://www.docstoc.com/docs/16851799/Why-Cloud-Backup-Recovery-(Private-Public-or-Hybrid)-WILL-be, printed Jun. 18, 2010.

LAPLINK, Laplink Offers Licensing for Windows XP to Windows 7 Upgrade Solution, Oct. 28, 2009.

PROQUEST, Sprint and MercuryMD Team up to Offer Healthcare Providers One-Stop Shopping Opportunity for Mobility Solutions, PR Newswire, New York, Apr. 27, 2004.

Michigan Retailers Association, Member Services, Electronic Gift Card Processing FAQ, http://www.retailers.com/memberservices/giftcardsfaq.html, printed Apr. 19, 2010.

CISCO License Manager 2.2, http://www.cisco.com/en/US/products/ps7138/index.html, printed Jun. 15, 2010.

* cited by examiner

RESTORATION OF AN IMAGE BACKUP USING INFORMATION ON OTHER INFORMATION HANDLING SYSTEMS

BACKGROUND OF THE INVENTION

1. Field of the Invention

The present invention relates to information handling systems and more particularly to restoration of an image backup using information from other information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling system environments with cloud storage. Cloud storage refers to a dataspace, often stored within server farms based in remote locations which may be accessed via the Internet, that functions as storage (e.g., for backing up) information from information handling systems. This dataspace is often leased by an organization to provide for information backup off site in case of disaster (fire, theft, etc). Access speed may be limited due to the average bandwidth of the Internet connection. Techniques have been developed, such as allowing bytes to relatively slowly be transferred (i.e., to drizzle) to the dataspace, to address the bandwidth issues.

These backups are increasingly likely to include images of the client information handling systems, which can be used to restore an information handling system to a fully bootable and functional state quickly. Backup images of a system can comprise the operating system, device drivers, installed applications, user preferences, user data, etc. Backing up the entire information handling system is desirable to facilitate a full restoration of a 'crashed' information handling system. An entire backup is also desirable so that a user can have peace of mind that everything on the information handling system is backed up. Thus, when and if the reinstallation of the backed up information is desired, the user does not have to rebuild the operating system, drivers, applications and data. The user may revert the information handling system back to a point in time when it was working The price of online storage is quickly decreasing to make the required storage affordable.

Restoring a complete information handling system image from an Internet based backup can be a very long process. Once the information handling system boots to a CD or other media, the information handling system can begin the process of pulling down bits from the dataspace. This process can potentially take many days on an average server message block (SMB) type connection. Failure of the link during the retrieval process often aborts the restore operation.

SUMMARY OF THE INVENTION

In accordance with the present invention, a restoration process is set forth which first attempts to recover information blocks from locally connected information handling system executing a backup/restore service before looking to the slower access cloud store to recover information blocks.

More specifically, in one embodiment, the invention relates to a method for allowing restoration of information to an information handling system using information from other information handling systems. The method includes storing information from all information handling systems on a network to an off site datastore; creating a common database, the common database cataloging information stored to the off site datastore; storing the common database of the cataloged information to the off site datastore; creating individual respective catalogs of information stored to the off site datastore for respective information handling systems on the network; storing in a database identities of all information handling systems in the network; determining whether a restoration is desirable; and, when a restoration is desirable, booting an information handling system to be restored to restoration media; obtaining, via the information handling system to be restored, access to the database describing identities of information handling systems in the network; recovering information for restoration from other functioning information handling system on the network as possible; determining whether there is any additional information to be restored that is not available from the functioning information handling systems; and, if there is any additional information to be restored, then obtaining the additional information from the off site datastore.

In another embodiment, the invention relates to a method for performing a backup operation, the backup operation enabling restoration of information to an information handling system using information from other information handling systems comprising: storing information from all information handling systems on a network to an off site datastore; creating a common database, the common database cataloging information stored to the off site datastore; storing the common database of the cataloged information to the off site datastore; creating individual respective catalogs of information stored to the off site datastore for respective information handling systems on the network; and, storing in a database identities of all information handling systems in the network.

In another embodiment, the invention relates to a method for performing a restoration of information to an information handling system using information from other information handling systems on a network comprising: booting an information handling system to be restored to restoration media; obtaining, via the information handling system to be restored, access to a database describing identities of information handling systems in the network; recovering information for restoration from other functioning information handling system on the network as possible; determining whether there is any additional information to be restored that is not available from the functioning information handling systems; and, if there is any additional information to be restored, then obtaining the additional information from an off site datastore.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
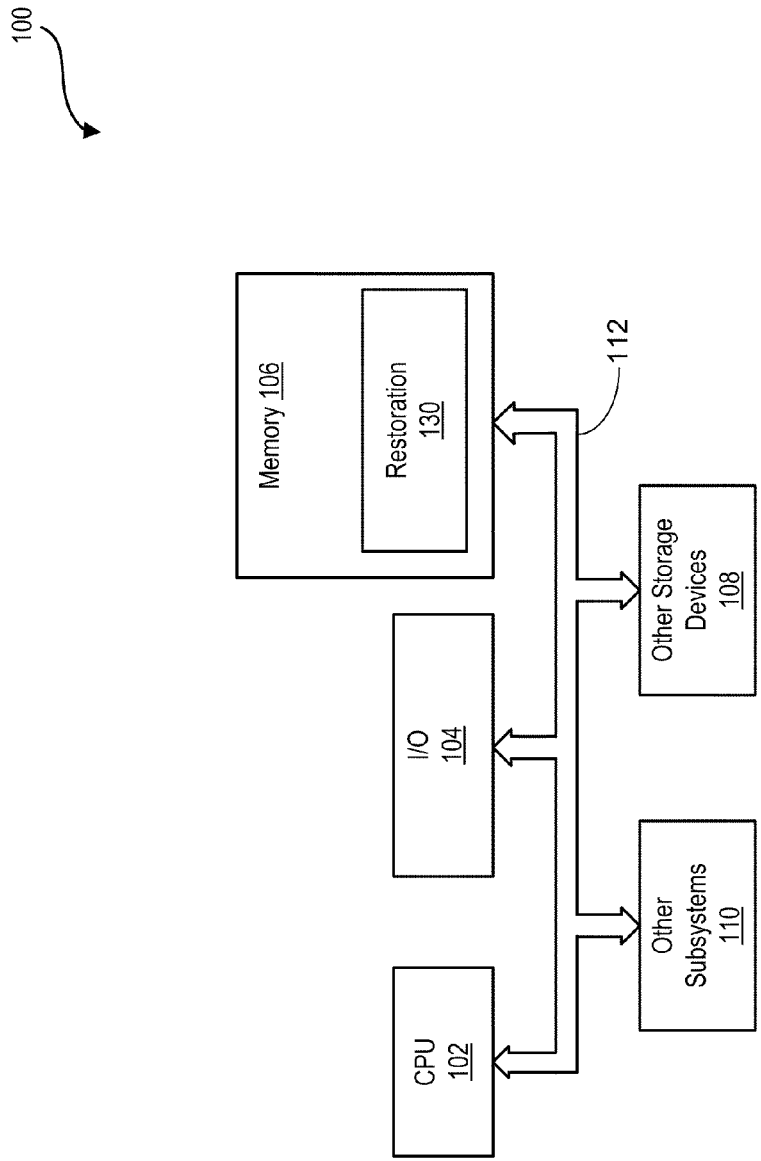
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

The information handling system 100 further includes a restoration system 130 stored on the memory 106 and having instructions which are executable by the processor 102. The restoration system 130 performs a restoration process which first attempts to recover information blocks from locally connected storage machines executing a backup/restore service before looking to any slower access cloud store to recover the information blocks.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
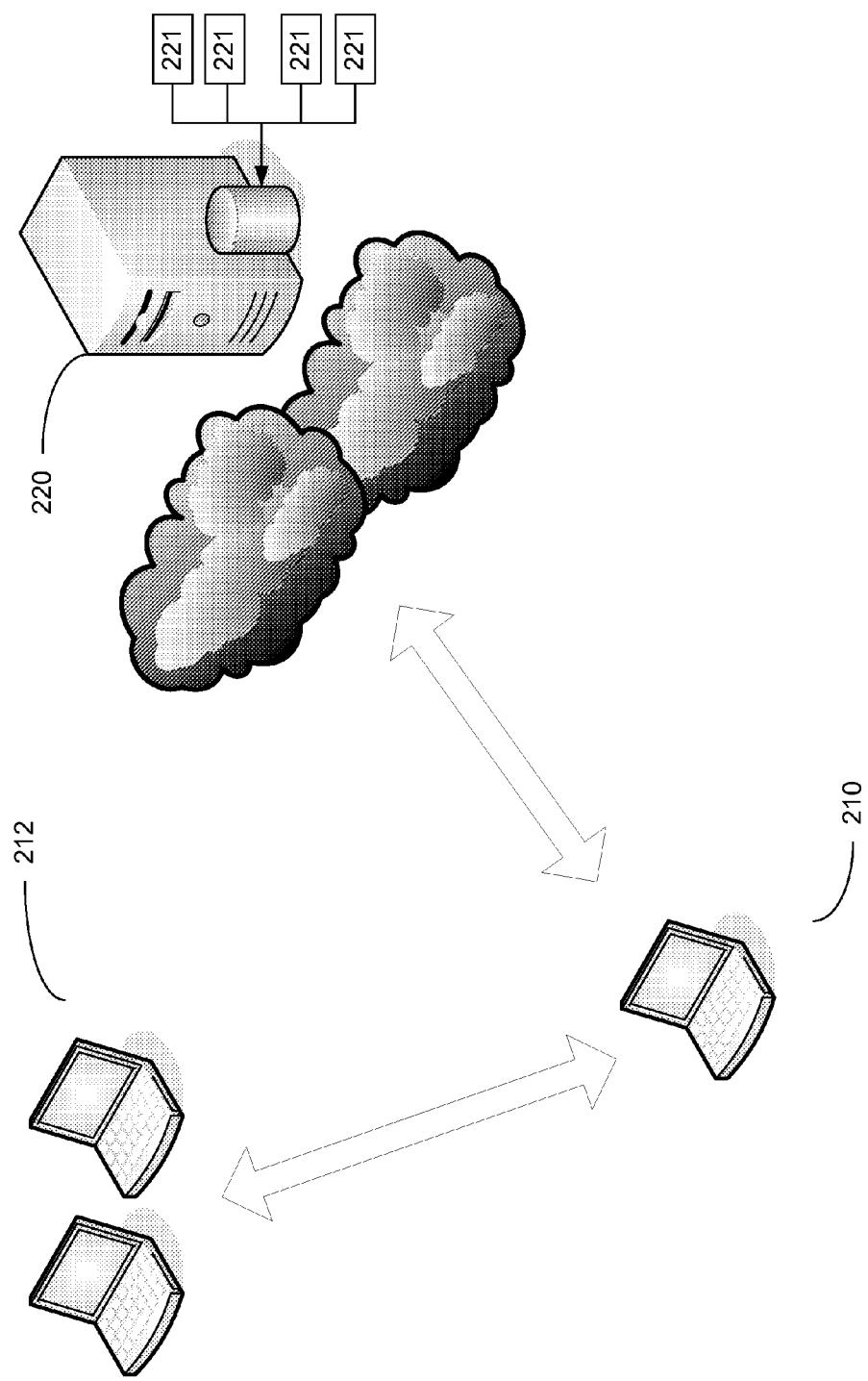
FIG. 2 shows a block diagram of an information handling system environment having a system for allowing restoration of an image backup using information from other information handling systems.

Referring to FIG. 2, a block diagram of an information handling system environment having a system for allowing restoration of an image backup using information from other information handling systems is shown. More specifically, the information handling system environment includes a client information handling system 210 to be restored as well as additional networked information handling systems 212 which are still functioning properly. The environment 200 further includes an offsite datastore 220 (e.g., a cloud backup) which stores individual respective catalogs 221 of information for respective information handling system.

In a typical office or home network, vast amounts of information in a server message block (SMB) environment is common to many (or all) information handling systems in the environment. The operating system, drivers, productivity applications (such as the Office application suite available from Microsoft, Inc.) and other applications are normally present on several machines which are still operating on the network of the environment. If those information handling systems have already been cataloged during backup (e.g., via a block level hashing process (common to a de-duplication process)) and that backup database contains information of all the information handling systems that are backed up while maintaining the relationship of each information block to the machine from which it was copied along with the unique identifier for the contents of that information block (a desirable feature for de-duplication) then the restore process does not have to retrieve information from the cloud if that same information could be retrieved from the local network from a still operating information handling system. Thus, the environment allows for peer to peer awareness of information which is available on all of the information handling systems on the network. In certain embodiments, this peer to peer awareness is performed by allowing access to respective catalogs of individual information handling systems by other information handling systems on the network.

Figure 3:
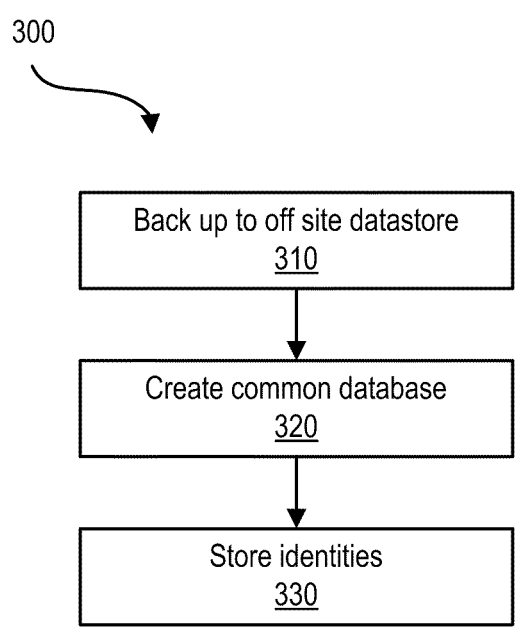
FIG. 3 shows a flow chart of the operation of a system for allowing restoration of an image backup using information from other information handling systems.

Referring to FIG. 3, a flow chart of the operation of a system 300 for performing an image backup is shown. More specifically, during the backup process all information handling systems are backed up to the off site datastore (e.g., to the cloud) at step 310. This off site backup is necessary in case of a local disaster where all local copies are destroyed or somehow damaged. Next, at step 320, a backup client on each information handling system updates or creates a database in the cloud with an identifier of the local information handling system from which the information originated, a unique hash created identifier that describes the unique content, the physical location of the information on the information handling machine and the actual information (file or block). Next, at step 330, a local copy of the updates specific to the local information handling system may also be kept local to the information handling system for rapid retrieval. This local copy does not contain another copy of the actual information since that information resides on the information handling system already in its usable form.

Figure 4:
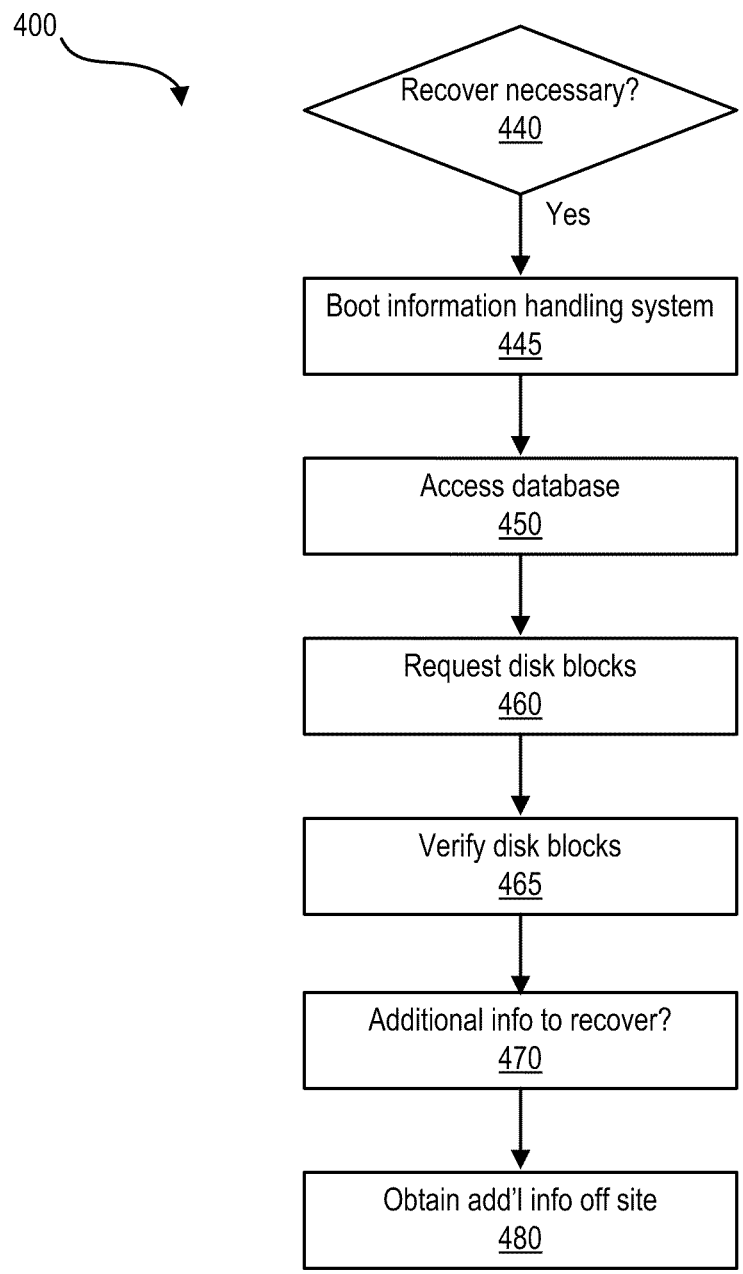
FIG. 4 shows a flow chart of the operation of a system for performing a restoration of an image backup using information from other information handling systems.

Referring to FIG. 4, a flow chart of the operation of a system 400 for performing a restoration of an image backup using information from other information handling systems is shown. More specifically, should a restoration become desirable (e.g., due to a system crash or a virus infestation), as determined by step 440, the information handling system to be recovered is booted to restoration media (CD, USB, etc) and connected to the local and wide area networks at step 445. Next, at step 450, the information handling system obtains access to the cloud database describing the disk cluster hashes required to restore itself. Other information handling systems on the local network may also have their own databases created during the backup process for enhanced rapid access. Next, at step 460, the information handling system requests the specific content disk blocks by their unique describing hash identifier pointer from other functioning information handling systems indicated to contain that block of information. The recovering information handling system recovers those blocks as required to rebuild its memory to the same state it was during the last backup process. Next at step 465 the blocks are verified during the recover process to continue to provide a valid has code in case the hash codes was altered since the database was created. Next, at step 470, the restoration process determines whether any additional information has not been recovered from the local information handling systems. If there is any additional information, then the restoration process obtains this additional information from the off site datastore at step 480.

By this method, cloud restoration without a local network attached storage (NAS) or appliance could be accomplished very rapidly in a business or home environment. Only information handling system specific information need be recovered at the slower internet access rate. The present invention provides an advantage of enabling offsite protection along with rapid restoration of all information (in almost all cases not involving site disaster). The rapid restoration is accessible via a trivial user interface.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for allowing restoration of information to an information handling system using information from other information handling systems comprising:
   storing information from all information handling systems on a network to an off site datastore;
   creating a common database, the common database cataloging information stored to the off site datastore;
   storing the common database of the cataloged information to the off site datastore;
   creating individual respective catalogs of information stored to the off site datastore for respective information handling systems on the network;
   allowing access to respective catalogs of individual information handling systems by other information handling systems on the network so as to allow peer to peer awareness of information which is available on all of the information handling systems on the network;
   storing in a database identities of all information handling systems in the network;
   determining whether a restoration is desirable; and,
      when a restoration is desirable,
         booting an information handling system to be restored to restoration media;
         obtaining, via the information handling system to be restored, access to the database describing identities of information handling systems in the network;
         recovering information for restoration from other functioning information handling system on the network as possible;
         determining whether there is any additional information to be restored that is not available from the functioning information handling systems; and,
         if there is any additional information to be restored, then obtaining the additional information from the off site datastore.

2. The method of claim 1 wherein:
the restoration uses a server application where the server application enables local storage of the information and the common database.

3. The method of claim 1 wherein:
the storing information from all information handling systems on a network to an off site datastore performs an equivalency operation of information to be stored to the off site datastore and stores single copies of equivalent information to the off site datatore.

4. The method of claim 3 wherein:
the equivalency operation identifies cluster hashes of information blocks to be stored to the off site datastore.

5. The method of claim 1 wherein:
the restoration media comprises at least one of a compact disk (CD), a digital video disk (DVD) and a universal serial bus (USB) memory device.

6. The method of claim 1 wherein:
other information handling systems on the network also comprise respective caches of their respective databases for enhanced rapid access.

7. The method of claim 1 wherein:
the recovering information for restoration from other functioning information handling systems on the network performs a cluster operation to determine whether the functioning information handling system have a byte for byte equivalent of the information to be restored.

8. The method of claim 1 wherein:
the recovering information for restoration from other functioning information handling systems on the network performs a cluster operation to determine whether the functioning information handling system have a byte for byte equivalent of the information to be restored.

9. A method for performing a backup operation, the backup operation enabling restoration of information to an information handling system using information from other information handling systems comprising:
   storing information from all information handling systems on a network to an off site datastore;
   creating a common database, the common database cataloging information stored to the off site datastore;

storing the common database of the cataloged information to the off site datastore;

creating individual respective catalogs of information stored to the off site datastore for respective information handling systems on the network;

storing in a database identities of all information handling systems in the network; and, allowing access to respective catalogs of individual information handling systems by other information handling systems on the network so as to allow peer to peer awareness of information which is available on all of the information handling systems on the network.

10. The method of claim 9 wherein:

the backup operation uses a server application where the server application enables local storage of the information and the common database.

11. The method of claim 9 wherein:

the storing information from all information handling systems on a network to an off site datastore performs an equivalency operation of information to be stored to the off site datastore and stores single copies of equivalent information to the off site datatore.

12. The method of claim 11 wherein:

the equivalency operation identifies cluster hashes of information blocks to be stored to the off site datastore.

13. A method for performing a restoration of information to an information handling system using information from other information handling systems on a network comprising:

booting an information handling system to be restored to restoration media;

obtaining, via the information handling system to be restored, access to a database describing identities of information handling systems in the network;

recovering information for restoration from other functioning information handling system on the network as possible;

allowing access to respective catalogs of individual information handling systems by other information handling systems on the network so as to allow peer to peer awareness of information which is available on all of the information handling systems on the network;

determining whether there is any additional information to be restored that is not available from the functioning information handling systems; and, if there is any additional information to be restored, then obtaining the additional information from an off site datastore, the off site datastore storing individual respective catalogs on information for respective information handling systems on the network.

14. The method of claim 13 wherein:

the restoration media comprises at least one of a compact disk (CD), a digital video disk (DVD) and a universal serial bus (USB) memory device.

15. The method of claim 13 wherein:

other information handling systems on the network also comprise respective caches of respective databases for enhanced rapid access.

\* \* \* \* \*